Nov. 6, 1923.  
M. LOUGHEAD  
1,472,801  
PNEUMATICALLY ASSISTED PRESSURE PRODUCING MECHANISM  
Filed Jan. 23, 1922  
2 Sheets-Sheet 1
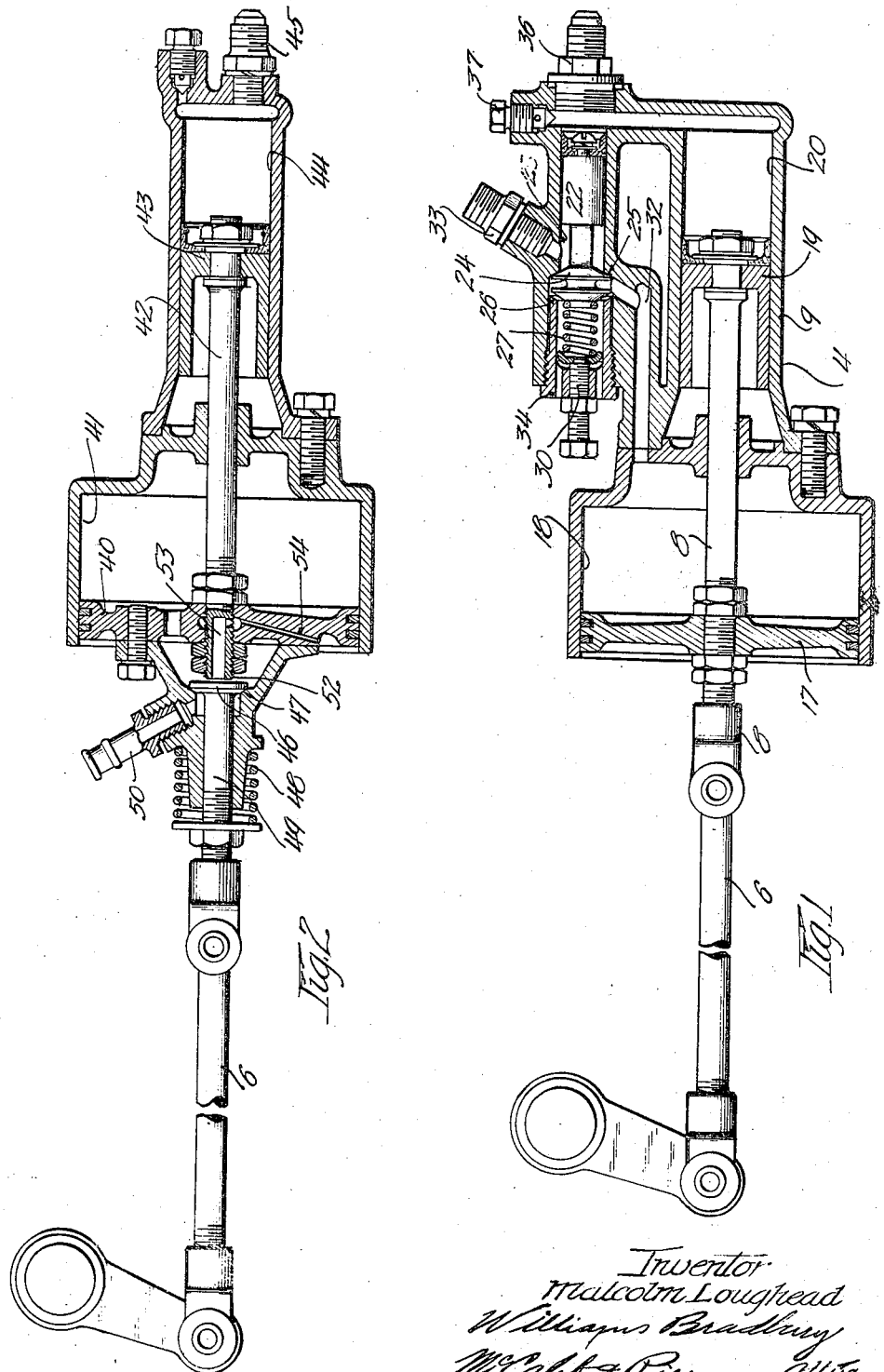
Inventor  
Malcolm Loughead  
Williams Bradbury  
McCabe & Pierce Attys.

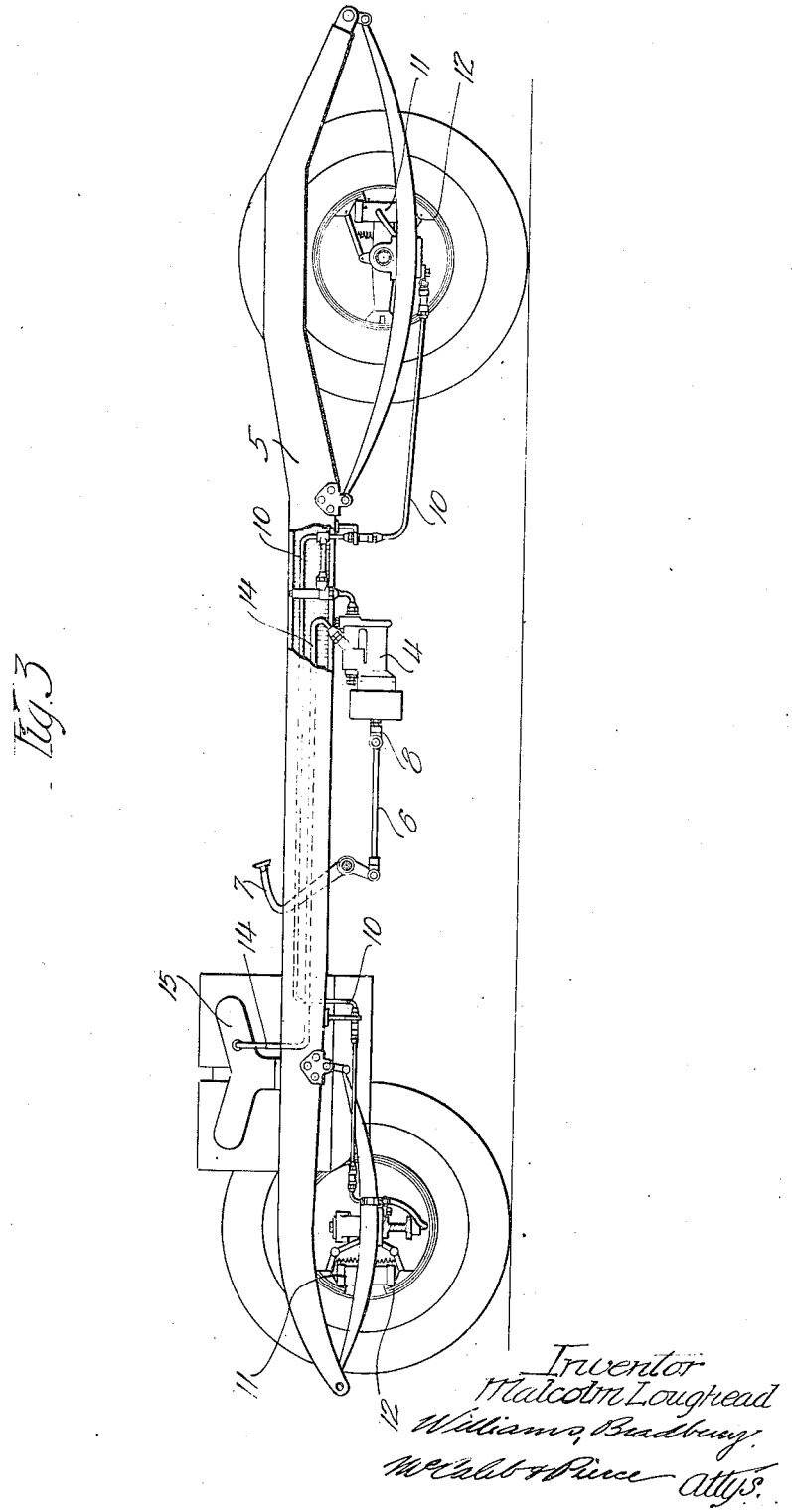

Patented Nov. 6, 1923.

1,472,801

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

PNEUMATICALLY-ASSISTED PRESSURE-PRODUCING MECHANISM.

Application filed January 23, 1922. Serial No. 531,144.

*To all whom it may concern:*

Be it known that I, MALCOLM LOUGHEAD, a citizen of the United States, and resident of Detroit, in the county of Wayne and State of Michigan, have invented a certain new and useful Improvement in Pneumatically-Assisted Pressure-Producing Mechanism, of which the following is a full, clear, concise, and exact description, reference being had to the accompanying drawings, forming a part of this specification.

My invention relates to combined manual and suction operated pressure pumps for use on automobiles in the control of fluid operated brakes.

My invention relates particularly to a device so constructed that, when pressure is applied by the driver, usually with the foot, the application of that pressure operates a valve to control the application of suction derived from the intake manifold of the engine, or some other suction producing device driven by the engine, and that the release of manual or foot pressure on the brakes serves also to relieve the application of suction.

The result of this combination is that the braking apparatus is more easily operated than if the assistance of the suction is not obtained.

Two separate embodiments of my invention are illustrated and described herein, one embodiment including means for operating the suction valve by purely mechanical means, the other embodiment including means for operating the suction valve through fluid pressure, the suction valve being opened to receive the assistance of the suction when the fluid pressure has attained a predetermined value and being closed so as not to receive the assistance of the suction when the fluid pressure is reduced to a predetermined value, the pressure obtainable through the operation of the suction operating device being insufficient under all conditions to alone cause the operation of the suction valve. My invention is illustrated in the accompanying drawings, in which—

Figure 1 is a section through the device in which the suction valve is operated by fluid pressure;

Figure 2 is a section through the device in which the suction valve is operated by mechanical means;

Figure 3 is an illustration of an automobile chassis showing the method of connecting the suction operated device with the engine manifold and the method of connecting the fluid pressure cylinder with the braking mechanism to be operated by fluid pressure.

Referring more particularly to Figure 3, the housing 4 is supported beneath the automobile frame 5 and has slidably arranged therein a piston rod 8 which is connected by a rod 6 with the brake pedal 7 by means of which the piston rod 8 may be moved into and out of the housing. The housing 4 is connected by piping 10 with forward and rear fluid operated brake cylinders 11, these cylinders having pistons therein for the operation of the internally expanding brake bands 12. The housing 4 is also connected by piping 14 with the intake manifold 15 of the engine.

Referring now more particularly to Figure 1, the piston rod 8 carries a piston 17 working in a large cylinder 18 in the housing 4. The piston rod 8 also carries a piston 19 working in a cylinder 20. The large cylinder 18 is arranged, through apparatus to be hereinafter described, for receiving suction to assist the operation of the piston rod 8, while the small cylinder 20 contains fluid for the operation of the brakes. Within a portion of the housing 4 is a small piston 22 operating in a cylinder 23, the piston 22 being mechanically connected with a valve member 24 having a face adapted to contact with a seat 25 and another face adapted to contact with a seat 26. A spring 27 normally holds the valve member 24 against its seat 25, the degree of compression of this spring being regulated through its adjustable abutment 30.

The space between the two valve seates 25 and 26 communicates through a passage 32 with the interior of the cylinder 18. The space on the right-hand side of the valve 24 is connected through coupling member 33 and the pipe 14 with a suitable source of suction. The space on the left of the valve seat 26 is in communication with atmosphere through vent 34. A nipple 36 connects with the fluid line 10. A relief valve 37 is provided for drawing off air or gas which may accumulate in the fluid part of the system.

In the operation of the device illustrated in Figure 1, the driver applies foot pressure to the brake pedal 7, forcing the connecting rod 6 and the piston rod 8 toward the right. This causes a flow of fluid out of the cylinder 20 into the fluid line 10 until the pressure in the fluid line reaches a predetermined amount. When this predetermined pressure has been reached, the piston 22 is caused to move to the left within the cylinder 23, thus shifting the valve 24 off its seat 25 and onto its seat 26. This movement of the valve 22 opens the communication between the large cylinder 18 and the suction line 14, whereupon the decrease in pressure within the cylinder 18 assists in the movement of the piston rod 8 to the right, causing an increase in the fluid pressure in the cylinder 20 and the fluid line 10. Upon release of the foot pressure on the pedal 7, the fluid pressure in the cylinder 20 causes the piston 19 to move to the left carrying with it the rod 8 and piston 17. When the fluid pressure has been reduced to such an extent that the spring 27 overcomes the pressure on the piston 22, the valve 24 is shifted to its illustrated position and atmosphere is permitted to enter the cylinder 18, thus wholly relieving the pressure on the fluid in the cylinder 20. The adjustment of the spring 27 must be such that for the greatest degree of suction which is under any circumstances produced in the engine manifold, the pressure produced thereby in cylinder 20 will be insufficient to hold the piston 22 in its left-hand position.

In the form of device illustrated in Figure 2, a piston 40 operates within a cylinder 41, this piston being connected through a rod 42 with a smaller piston 43 operating in a cylinder 44, the latter being connected through a nipple 45 with the fluid line 10 extending to the brake cylinders 11. The piston 40 carries a valve 46 normally held on its seat 47 by a spring 48 acting through the valve stem 49. The space to the left of the valve seat 47 is connected through a nipple 50 with the suction line 14 and a suitable source of suction. The valve 46, when moved to the right, contacts with a flat valve seat 52 which incloses a passageway 53 which is in communication with atmosphere through a duct 54. In operation, the application of pressure on the brake pedal 7 causes the connecting rod 6 to be moved to the right. The spring 48 is under a considerable normal compression, and thus the pistons 40 and 43 are caused to likewise move to the right until the pressure in cylinder 44 reaches a predetermined amount, whereupon the spring 48 will be compressed and the valve 46 moved off its seat 47 and into contact with the seat 52. Under these conditions, suction from the suction line 14 is communicated to the interior of the cylinder 41, causing the piston 40 to be drawn inwardly, thus assisting in applying pressure to the fluid within cylinder 44. Upon the relief of the foot pressure, the valve 46 is immediately returned to its normal position through the action of the spring 48 and communication is opened between the interior of cylinder 41 and atmosphere through the valve seat 52 and passages 53 and 54. Thus the pressure of the fluid within the cylinder 44 causes the return of the pistons 43 and 40 to their normal positions.

Although my invention is shown and described with respect to only two specific embodiments, it is to be understood that I do not wish to be limited thereto, still further embodiments being contemplated.

The outstanding feature of the present invention is the provision of a braking means which is initially operated by manual means and subsequently is operated wholly or in part by extraneous means.

The invention, therefore, should include all the above noted and other similar modifications and should be limited merely by the scopes of the appended claims.

What I claim is:

1. In a device for placing fluid under pressure for the operation of brakes, means for manually operating said device to create pressure, and power means rendered operative responsive to the movement of the manually operated means for creating additional pressure.

2. In a device for creating fluid pressure for the operation of fluid operated brakes, a manually operated member for applying pressure to the fluid, and power operated member for assisting in applying pressure to the fluid.

3. In a device for creating fluid pressure for the operation of fluid operated brakes, a manually operated member for applying pressure to the fluid, and a pneumatically operated means for assisting in applying pressure to the fluid.

4. In a device for creating fluid pressure for the operation of fluid operated brakes, a manually operated member for applying pressure to the fluid, and a pneumatically actuated means rendered operative by the initial operation of said manually operated member for assisting in applying pressure to the fluid.

5. In a device for the operation of brakes, a cylinder, a pneumatically operated piston therein, manually operated means for initially moving the brakes and means responsive to the application of force to the manual means for opening a connection to the cylinder of the pneumatically operated piston.

6. In a device for the operation of fluid operated brakes, a manually operated member for creating pressure on the brake operating fluid, suction operated means for assisting in the operation of said manually operated member, and means responsive to the manual operation of the manually operated member for applying suction to the suction operated member.

7. In a device for creating fluid pressure for the operation of fluid operated brakes, a fluid cylinder, a piston therein, a suction cylinder, a piston therein, manual means for moving the piston in the fluid cylinder, and means responsive to the application of force to the manual means for opening a suction connection to the suction cylinder.

8. In a device for creating fluid pressure for the operation of fluid operated brakes, a manually operated member for applying pressure to the fluid, and a suction operated member for assisting in applying pressure to the fluid.

9. A device for creating pressure for the operation of fluid operated brakes, means for manually operating said device to create pressure, and suction operated means responsive to the movement of the manually operated means for creating additional pressure on the fluid.

10. A device for creating fluid pressure for the operation of motor vehicle brakes having a pair of axially aligned cylinders of widely differing diameters, a piston in each of said cylinders, said pistons being mechanically connected together, means for manually moving said pistons for creating pressure in fluid within the smallest cylinder, and means for applying suction within the larger cylinder which acts through the piston in said larger cylinder to assist in applying pressure to the fluid in the smaller cylinder.

11. In a device for creating fluid pressure for the operation of motor vehicle brakes, a cylinder, a piston therein, a chamber communicating with the interior of said cylinder, a connection communicating with a suitable source of suction, a second connection communicating with atmosphere, a valve having two positions, one affording communication between said chamber and atmosphere, the other affording communication between said chamber and said source of suction, and means for operating said valve responsive to the manual application of force for applying pressure to the fluid for the operation of the vehicle brakes.

12. In a device for creating fluid pressure for the operation of vehicle brakes, a fluid cylinder, a chamber receiving pressure from said fluid cylinder, a valve operating piston receiving fluid pressure from said chamber, a suction operated device for adding pressure to the fluid in said chamber, and a valve operated by said valve operating piston for applying suction to said suction operated device when the fluid pressure rises to a predetermined value, said valve serving also to again cut off the suction communication from said suction operated device when the fluid pressure again falls to a predetermined value.

13. In a device for creating fluid pressure, a valve operating piston in communication with the fluid under pressure, an air operated piston, a cylinder therefor, a source of air pressure different from that of the atmosphere, a valve affording communication between said source and said cylinder, said valve in its alternate position affording communication between said cylinder and the atmosphere, said valve being connected with said valve operating piston, a spring normally holding said valve in one of its alternate positions, said piston serving, when the fluid pressure thereon reaches a predetermined amount, to shift said valve to its alternate position against the pressure of said spring for opening the communication between said cylinder and said source of air pressure, said spring serving to return said valve to its alternate position in which said cylinder is in communication with atmosphere when the fluid pressure on said valve operating piston drops to a predetermined value.

14. In a braking apparatus, brake operating means including a fluid pressure cylinder and a piston therein, manually actuated means for operating said piston, and pneumatically actuated means rendered operative by the operation of said manually actuated means for assisting in the actuation of said piston.

15. In a fluid operated braking system, brake operating mechanism including means for placing fluid under pressure, manually actuated apparatus for operating said means, and pneumatically actuated apparatus for assisting in the operation of said means.

16. In a fluid operated brake system, brake operating mechanism including means for placing fluid under pressure, manually actuated apparatus for operating said means, and pneumatically actuated apparatus rendered operative by the operation of said manually actuated apparatus for assisting in the operation of said means.

In witness whereof I hereunto subscribe my name this 9th day of January, 1922.

MALCOLM LOUGHEAD.

Witnesses:
EMILE BOURGEOIS,
DAGMAR PETERSON.